United States Patent Office 3,535,365
Patented Oct. 20, 1970

3,535,365
PREPARATION OF 2,6-DICHLORO-4-METHOXY-BENZONITRILE
Leonard M. Weinstock, Rocky Hill, and Roger J. Tull, Metuchen, N.J., assignors to Merck & Co., Inc., Rahway, N.J., a corporation of New Jersey
No Drawing. Filed Nov. 29, 1967, Ser. No. 687,959
Int. Cl. A01n 9/20; C07c 121/74, 12/78
U.S. Cl. 260—465                               1 Claim

ABSTRACT OF THE DISCLOSURE

A method for preparing 2,6-dichloro-4-methoxy benzonitrile from 2,6-dichloro-4-nitrotoluene, by treating the dichloronitrotoluene with sodium methoxide and cupric chloride in the presence of oxygen and ammonia.

BACKGROUND OF THE INVENTION

Field of the invention 2,6-dichloro-4-substituted nitrobenzonitriles having insecticidal activity.

SUMMARY OF THE INVENTION

This application relates to novel 4-substituted 2,6-dichlorobenzonitriles, exhibiting pesticidal activity and to their methods of preparation.

More specifically, this application relates to novel 2,6-dichlorobenzonitriles wherein the 4-position is substituted with a loweralkoxy, loweralkenyloxy, lower alkylthio, benzyloxy, phenoxy, or an amino radical, prepared by treating 2,6-chloro-4-nitrobenzonitrile with a sodium hydrocarbon oxide or a sodium mercaptide or an amine, in an alcoholic medium.

This application also relates to a novel method for preparing 2,6-dichloro-4-methoxybenzonitrile by treating 2,6-dichloro-4-nitrotoluene and sodium methoxide and cupric chloride in a methanolic solvent and in the presence of excess ammonia and oxygen.

DESCRIPTION OF THE PREFERRED EMBODIMENTS

Crop protection from insects, mites, aphids and other pests that feed on plants is an important consideration in both large and small scale farming practices, as the presence of insects in appreciable numbers can affect both the quantity and quality of the harvested crop. It is essential, therefore, for maximum yield, that insecticides be employed for plant protection.

According to one aspect of our invention we have found that when 2,6-dichlorobenzonitrile is substituted at the 4-position, novel compounds are formed which exhibit insecticidal activity. The novel compounds of this invention have the following formula

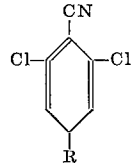

wherein R represents loweralkoxy (such as methoxy, propoxy, isopropoxy, butoxy, and the like), loweralkenyloxy (such as allyloxy, methallyloxy and butenyloxy), phenoxy, benzyloxy, loweralkylthio (such as methylthio, ethylthio and propylthio), or amino. The loweralkylthio and loweralkoxy radicals stated above suitably contain from 1–5 carbon atoms and the alkenyloxy substituent may contain from 3–5 carbon atoms. Where R is an amino function it may be a primary alkylamine and particularly a loweralkyl amino having from 1–5 carbon atoms, such as methylamino, ethylamino and propylamino, or it may be a secondary loweralkylamine such as diloweralkylamino, in which case the alkyl groups may also contain from 1–5 carbon atoms. In addition, the alkyl groups of the diloweralkylamino functions may be the same or different, examples suitably being dimethylamino, diethylamino, methylethylamino, methylpropylamino, or ethylbutylamino.

The above-stated compounds have been tested and found to be effective against a wide variety of insects, including the Mexican beatle (*Epilachna rarivestris*) and the two-spotted spider mite (*Tetranychus bimaculatus*) which infest bean crops, the Southern army worm (*Prodenia eridania*) which infests celery, sweet potatoes and cotton, and the pea aphid (*Macrosephum pisi*).

The compounds of this invention may be used by dissolving them in acetone or other suitable solvents, diluting to an appropirate concentration, and spraying the solution upon growing crops at the critical time during the life cycle of the insect from which protection is desired. The concentrations at which the compounds of our invention are effective usually range from about 50–1,000 p.p.m., and the finished insecticidal composition may additionally contain wetting and emulsifying agents to further enhance their effectiveness. In addition, the compounds of this invention may be formulated into compositions containing other well known insecticides to form a composition having a much broader insecticidal spectrum.

The novel compounds of this invention may be prepared by contacting 2,6-dichloro-4-nitrobenzonitrile in the presence of a solvent with (a) sodium hydrocarbon oxides wherein the hydrocarbon is selected from the group consisting of loweralkyl, loweralkenyl, phenyl and benzyl; (b) sodium mercaptides and (c) primary or secondary lower alkylamines.

Thus, when 2,6-dichloro-4-nitrobenzonitrile is reacted with a sodium hydrocarbon oxide wherein the hydrocarbon is loweralkyl having 1–5 carbon atoms and represented by a sodium alkoxide or loweralkenyl such as a sodium alkenyloxide, the corresponding benzonitrile is formed, wherein the nitro group of the starting benzonitrile is replaced by the respective alkoxy or alkenyloxy radical of the hydrocarbon oxide employed. Examples of suitable lower sodium alkoxides which may so be used are sodium methoxide, sodium ethoxide, sodium propoxide and the like. Suitable sodium alkenyloxides include sodium allyloxide, sodium methallyloxide, and soduim butenyloxide.

In a similar manner when the hydrocarbon oxide is sodium phenoxide or sodium benzylate, the corresponding 2,6 - dichloro - 4 - phenoxy-(or benzyloxy)-benzonitrile is formed.

When a mercaptide, preferably a sodium loweralkyl mercaptide containing 1–5 carbon atoms such as sodium methyl, ethyl, or propyl mercaptide is reacted with 2,6-dichloro-4-nitrobenzonitrile, the nitro group of the benzonitrile is replaced with an alkylthio group of the mercaptide employed, thus forming 2,6-dichloro-4-methylthio-(ethylthio or propylthio)-benzonitrile.

In instances when the sodium hydrocarbon oxide is not readily available, it may be prepared by methods well known in the art, for example by dissolving metallic sodium in an appropriate aliphatic or aromatic alcohol in an inert atmosphere such as nitrogen, and used directly without isolation from the reaction mixture.

Similarly, the corresponding alkylmercaptide may be prepared by dissolving a suitable alkylmercaptan in methanolic sodium methoxide.

The 2,6-dichloro-4-amino benzonitriles are prepared by reacting 2,6-dichloro-4-nitrobenzonitrile with an appropriate amine. Thus, if a primary amine, particularly a loweralkylamine such as methyl, ethyl, or propylamine, is used, a 2,6-dichlorobenzonitrile is formed, having the corresponding amino function in the 4-position. In a similar manner, the use of a secondary amine such as a diloweralkylamine exemplified by dimethyl, diethyl, dipropyl, or methylethyl amine, will form a 2,6-dichlorobenzonitrile having in the 4-position the amino function so employed.

Although the choice of solvents employed in preparing the novel compounds of this invention is not critical, the reacton is usually effected in an alcoholic medium. In certain cases, however, to prevent mixed products, it is preferable to use a particular alcohol. Thus, in preparing 2,6-dichloro-4-RO benzonitrile where R is alkyl, alkenyl or benzyl, an alcohol having the same aliphatic or aromatic radical as is contained in the hydrocarbon oxide employed is preferred. Another solvent may be employed, particularly in preparing phenoxy or amino substituted 2,6-dichlorobenzonitriles, is dimethylsulfoxide.

The temperature limitations at which the reaction is effected is also not critical, and may range anywhere from 0–80° C., however, a suitable temperature range at which the reaction will usually proceed satisfactorily is from about 25–65° C.

Another aspect of this invention is provision of a novel alternative method for preparing 2,6-dichloro-4-methoxybenzonitrile from 2,6-dichloro-4-nitrotoluene. According to this process both the methyl group and the nitro radical of the 2,6-dichloro-4-nitrotoluene are respectively replaced in one step by a nitrile and a methoxy radical by treating the aforementioned compound with sodium methoxide and cupric chloride in the presence of excess ammonia and oxygen in a methanolic solvent. In effecting this reaction, the molar quantities of the reactants are not particularly critical, but are preferably in excess of that necessary to satisfy the stoichiometry of the reaction. Thus, satisfactory results may be obtained when 3–4 moles of 2,6-dichloro-4-nitrotoluene are reacted at a temperature of from 0–200°, preferably at room temperature, with 2–4 moles of sodium methoxide and 1.5–2 moles of cupric chloride. Inasmuch as it has been found that the presence of water in the solvent or reaction mixture tends to quench the reaction, the methanol employed as the solvent should not contain more than 2% water, and preferably less than 1% water. In order to oxidize the methyl group of the nitrotoluene to the nitrile, ammonia and oxygen must be introduced into the methanolic solution containing the reactants. This is accomplished by bubbling ammonia into the reaction mixture until saturation occurs, whereupon the mixture is similarly treated with oxygen. After 3–16 hours of saturation with oxygen, the reaction is complete and the 2,6-dichloro-4-methoxybenzonitrile may be separated by filtration.

The following examples are given for the purpose of illustration, and not by way of limitation.

EXAMPLE 1

2,6-dichloro-4-methoxybenzonitrile

To a mixture of 180 ml. of methanol and 91 mm. (70 ml.) of 1.3 M of methanolic sodium methoxide is added 83 mm. (18 g.) of 2,6-dichloro-4-nitrobenzonitrile. The mixture is stirred at 25° for fifteen minutes and then refluxed for fifteen minutes. After cooling to 0° C. the material is filtered and washed with methanol. Upon recrystallization from methanol, 11.46 g. (67%) of 2,6-dichloro-4-methoxybenzonitrile is obtained, having a melting point of 157–159° C.

EXAMPLE 2

2,6-dichloro-4-ethoxybenzonitrile 2.6 g. (0.113 mole) of sodium is dissolved in 120 ml. absolute ethanol under nitrogen. To this solution is added 21.7 g. of 2,6-dichloro-4-nitrobenzonitrile. The mixture is stirred at 25° C. for one hour and then at 60–65° C. for one and one-half hours. 1.7 ml. of glacial acetic acid is then added and the mixture is cooled to 0° C. The resulting precipitate containing the 2,6-dichloro-4-ethoxybenzonitrile is filtered off and washed with water and upon recrystallization from absolute ethanol, 16.3 g. (75%) of 2,6-dichloro-4-ethoxybenzonitrile is obtained, having a melting point of 98–100° C.

EXAMPLE 3

2,6-dichloro-4-isopropoxybenzonitrile 1.75 g. (76 mm.) of sodium is dissolved in 150 ml. of isopropanol at reflux under a stream of nitrogen. To this solution is added 14.6 g. of 2,6-dichloro-4-nitrobenzonitrile. The mixture is refluxed for one hour and then cooled to 25° C. The resulting precipitate containing crude 2,6-dichloro-4-isopropoxybenzonitrile is filtered off and washed with isopropanol to yield 6.18 g. (39%) of impure 2,6-dichloro-4-isopropoxybenzonitrile upon drying. Water is added to the filtrates, precipitating an additional 5.23 g. (33%) of impure 2,6-dichloro-4-isopropoxybenzonitrile. The two crude fractions are combined, and upon recrystallization from absolute ethanol, 5.15 g. of 2,6-dichloro-4-isopropoxybenzonitrile is obtained, having a melting point of 79–81° C. Further recrystallization from 25 ml. of methanol yields 2,6-dichloro-4-isopropoxybenzonitrile having a melting point of 82° C.

EXAMPLE 4

2,6-dichloro-4-allyloxybenzonitrile 2.6 g. (0.113 mole) of sodium is dissolved in 120 ml. of allyl alcohol under nitrogen at a temperature below 50° C. This solution is added to a slurry containing 21.7 g. (0.1 mole) of 2,6-dichloro-4-nitrobenzonitrile in 50 ml. of allyl alcohol. The mixture is stirred at 25° C. for fifteen minutes and heated at 60–65° C. for one hour. 1.7 ml. of glacial acetic acid and 150 ml. of water are added and the mixture is then cooled to 0° C. The resulting precipitate containing 2,6-dichloro-4-allyloxybenzonitrile is filtered off, washed with water and dried. Upon recrystallization from isopropanol, 20.2 g. (89%) of 2,6-dichloro-4-allyloxybenzonitrile is obtained, having a melting point of 80–82° C.

EXAMPLE 5

2,6-dichloro-4-phenoxybenzonitrile 11.6 g. (0.1 mole) of sodium phenoxide is added to a slurry containing 21.7 g. (0.1 mole) of 2,6-dichloro-4-nitrobenzonitrile in 100 ml. of dimethylsulfoxide. After heating for ten minutes at 65° C. during which time the solids dissolve, the reaction mixture is cooled to room temperature and then poured into 500 ml. of stirred chopped ice, whereupon stirring is maintained for one hour. The mixture is filtered and the resulting precipitate washed with water, and dried in vacuo at 50° C. to give a yield of 25.0 g. of crude 2,6-dichloro-4-phenoxybenzonitrile, M.P. 83–85° C. The crude product is repeatedly recrystallized by dissolving in 250 ml. portions of methanol to give the pure 2,6-dichloro-4-phenoxybenzonitrile, having a melting point of 122.5–124° C.

EXAMPLE 6

2,6-dichloro-4-benzyloxybenzonitrile 2.6 g. (0.113 mole) of sodium is dissolved in 120 ml. of benzyl alcohol at 50–60° C. under a stream of nitrogen, and to this solution is added 21.7 g. (0.1 mole) of 2,6-dichloro-4-nitrobenzonitrile. After heating for one hour at 50–60° C. the mixture is cooled to 25° C. and 5 ml. of glacial acetic acid is added. The resulting precipitate containing 2,6-dichloro-4-benzyloxybenzonitrile is filtered off, washed successively with 20 ml. of benzyl alcohol, 2× 50 ml. of ether, and dried. When recrystallized several times from 600 ml. absolute alcohol containing 25 ml. of water, 16.7 g. of 2,6-dichloro-4-benzyloxybenzonitrile, M.P. 132–134° C. is obtained.

EXAMPLE 7

2,6-dichloro-4-methylthiobenzonitrile

Methyl mercaptan is passed into 75 ml. (0.11 moles) of 7.47 N methanolic sodium methoxide at 15° C. for one and one-half hours. To this solution is added 0.1 mole (21.7 g.) of 2,6-dichloro-4-nitrobenzonitrile. The resulting thick mixture is stirred at room temperature overnight. The excess of mercaptan is stripped off in vacuum and replaced by 200 ml. of water. The mixture is then filtered and the precipitate containing 2,6-dichloro-4-methylthiobenzonitrile is washed with water. When recrystallized from 600 ml. of methanol using 3 g. of charcoal, 2,6-dichloro-4-nitrobenzonitrile, M.P. 131.5–132.5° C. is obtained.

EXAMPLE 8

2,6-dichloro-4-ethylthiobenzonitrile 37.4 ml. (0.5 mole) of ethyl mercaptan is added to 77 ml. of a 1.43 N methanolic sodium methoxide below 25° C. 21.7 g. (0.1 mole) of 2,6-dichloro-4-nitrobenzonitrile is added to the mixture during which time the temperature of the mixture is maintained below 30° C. The mixture is stirred for 18 hours at 25° C. and most of the volatiles are removed in vacuo. 200 ml. of water is then added to the mixture and the resulting precipitate is filtered off, washed with water and then dried. Upon recrystallization from methanol and using characoal, 11.95 g. (52%) of 2,6-dichloro-4-ethylthiobenzonitrile, M.P. 79.5–80.5° C. is obtained.

EXAMPLE 9

2,6-dichloro-4-methylaminobenzonitrile

Dimethylamine is bubbled through a solution containing 0.1 mole (21.7 g.) of 2,6-dichloro-4-nitrobenzonitrile in 40 ml. of dimethylsulfoxide at a temperature of 60° C. for one and one-half hours. The solution is then cooled to room temperature and the reaction mixture is quenched with 400 ml. of water. Upon recrystallization, 2,6-dichloro-4-dimethylaminobenzonitrile (M.P. 208.5–211) is obtained.

EXAMPLE 10

2,6-dichloro-4-methoxybenzonitrile

A mixture containing 1 g. (4.85 mm.) of 2,6-dichloro-4-nitrotoluene dissolved in 10 ml. of absolute methanol at 25° C. is cooled to 0° C. The mixture is then saturated with ammonia by bubbling gaseous ammonia into the mixture for fifteen minutes, after which time the mixture is allowed to return to room temperature. After the addition of 200 mg. (1.5 mm.) of anhydrous cupric chloride, oxygen is then bubbled into the mixture, during which time there is added 2 ml. (2.0 m.) of 1 N sodium methoxide. The addition of oxygen is continued at room temperature for a period of 3–16 hours, whereupon the reaction mixture is filtered and the filter cake washed with methanol and dried in vacuo yielding 220 mg. of 2,6-dichloro-4-methoxybenzonitrile.

The compounds of this invention may be formulated into insecticidal compositions by combining the 4-substituted dihalobenzonitrile with an inert diluent. The inert diluent may be a suitable inert solvent which is nontoxic to vegetative matter or a mixture of solvents or a solid mixture, with or without other substances such as wetting agents, dispersing agents and sticking agents. The compounds may be employed in such compositions either as the sole toxic agent or in combination with other known insecticides such as DDT, Sevin, Dieldrin, Aldrin, and methylparathion, to provide compositions useful for household and agricultural dusts and sprays. For example, new compounds of this invention may be dissolved in acetone and diluted with deionized water containing wetting or emulsifying agents.

The compounds of this invention may also be combined with an inert, finely-divided, solid diluent or carrier such as bentonite, talc, clay, refined silicates, calcium carbonate, pumice and the like to form dusts.

The concentrations of the 4-substituted dihalobenzonitriles of this invention used in the above solutions, suspensions or dusting powders will vary somewhat with the amount of insect infestation present and also with the frequency necessary to treat a particular crop. In general, however, compositions containing a concentration from 0.005 to 0.5% of the 4-substituted dihalobenzonitrile have been found to be useful, although for most purposes an amount ranging from 0.005 to 0.1% is preferred.

What is claimed is:

1. A method for preparing the 2,6-dichloro-4-methoxybenzonitrile which comprises reacting at a temperature of from 0–200° C. 2,6-dichloro-4-nitrotoluene with sodium methoxide and cupric chloride in methanol containing no more than 2% water in the presence of an excess of ammonia and oxygen.

References Cited

UNITED STATES PATENTS 3,185,725  5/1965  Koopman _____ 260—465

FOREIGN PATENTS 684,553  4/1964  Canada.
1,375,311  9/1964  France.

OTHER REFERENCES

Houben-Weyl, Methoden der Organischen Chemie, Band VI 13, pp. 75–79 (1965); Band IX, p. 113 (1955); Band XI, pp. 236–241 (1957).

Chemical Abstracts, vol. 60, Subject Index, p. 378s (1964).

Chemical Abstracts, vol. 64, p. 10339b (1966).

CHARLES B. PARKER, Primary Examiner

D. H. TORRENCE, Assistant Examiner

U.S. Cl. X.R.

424—304